(12) United States Patent
Kuroiwa et al.

(10) Patent No.: US 7,042,194 B1
(45) Date of Patent: May 9, 2006

(54) CONTROLLER FOR A WOUND-ROTOR INDUCTION MOTOR

(75) Inventors: Akihiko Kuroiwa, Tokyo (JP); Kazuyuki Deguchi, Tokyo (JP)

(73) Assignee: Toshiba Mitsubishi-Electric Indus. Sys. Corp., Tokyo (JP)

( * ) Notice: Subject to any disclaimer, the term of this patent is extended or adjusted under 35 U.S.C. 154(b) by 0 days.

(21) Appl. No.: 11/236,577

(22) Filed: Sep. 28, 2005

(30) Foreign Application Priority Data

Nov. 5, 2004 (JP) .............................. 2004-322001

(51) Int. Cl.
*H02P 25/00* (2006.01)

(52) U.S. Cl. ..................... 318/811; 318/810; 318/722

(58) Field of Classification Search .............. 318/811, 318/810, 722, 438

See application file for complete search history.

(56) References Cited

U.S. PATENT DOCUMENTS

| | | | | |
|---|---|---|---|---|
| 3,699,416 A | * | 10/1972 | Sloan et al. ................. | 318/761 |
| 4,672,286 A | * | 6/1987 | Williams .................... | 318/798 |
| 4,935,684 A | * | 6/1990 | Watanabe ................... | 318/729 |
| 5,373,223 A | * | 12/1994 | Akagi et al. ................ | 318/722 |
| 5,680,010 A | * | 10/1997 | Weiss et al. ................ | 313/636 |
| 6,075,717 A | * | 6/2000 | Kumar et al. ................ | 363/87 |
| 6,269,010 B1 | * | 7/2001 | Ma et al. ..................... | 363/35 |
| 6,448,735 B1 | | 9/2002 | Gokhale et al. ............ | 318/700 |

FOREIGN PATENT DOCUMENTS

| | | |
|---|---|---|
| JP | 2569016 | 10/1996 |
| JP | 2003-134871 | 5/2003 |

* cited by examiner

*Primary Examiner*—Rita Leykin
(74) *Attorney, Agent, or Firm*—Oblon, Spivak, McClelland, Maier & Neustadt, P.C.

(57) ABSTRACT

A controller for a wound-rotor induction motor includes a first voltage-type converter connected to a secondary winding of the motor, a capacitor for smoothing DC output thereof, a second voltage-type converter to supply an AC power supply with regenerated secondary power, a speed detector of the motor, a secondary current detector of the motor, a DC voltage detector applied to the capacitor, a speed controller for controlling the speed by the speed detector and outputting a secondary referential current, a first PWM controller to control the secondary current in response to the referential current, and to output a voltage signal by witch switching elements of the first voltage-type converter are controlled by PWM, and a second PWM controller to control a voltage output from the voltage detector in response to a referential voltage, and to control by PWM switching elements of the second voltage-type converter.

9 Claims, 6 Drawing Sheets

CONTROLLER FOR A WOUND-ROTOR INDUCTION MOTOR

CROSS REFERENCE TO RELATED APPLICATION

This application is based upon and claims the benefit of priority from the prior Japanese Patent Application No. 2004-322001 filed on Nov. 5, 2004; the entire contents of which are incorporated herein by reference.

BACKGROUND OF THE INVENTION

1. Field of the Invention

The present invention relates to an improved controller for a wound-rotor induction motor.

2. Description of the Prior Art

The Scherbius apparatus has been used as a variable speed driving controller for a pump or a fan. The Scherbius apparatus uses a wound-rotor induction motor. A secondary winding of the wound-rotor induction motor is connected to a rectifier, and a regenerated secondary power is supplied to an AC power supply via a DC reactor and an inverter. The Scherbius apparatus has an advantage of high controllability because it directly controls a secondary current of the induction motor proportional to motor torque. The secondary power of the induction motor is regenerated to the power supply, so that the speed control is executed efficiently, and even when the converter fails, by switching to the secondary resistance control mode, the operation can be continued, so that it is applied to a public field such as water supply and drainage.

The conventional Scherbius apparatus uses a thyristor for the inverter connected to the power supply, so that it has disadvantages such that the power factor of the inverter is low and the apparatus is affected by voltage fluctuation of the power supply. Furthermore, the secondary current is rectified by a diode bridge to a square wave at a continuity angle of 120°, so that the secondary current waveform includes harmonic ripples, and as a result, a problem arises that motor torque ripples are generated.

In order to avoid such a problem, a controller for a wound-rotor induction motor is proposed in Japanese Patent Publication (Kokai) No. 2003-134871. This controller has a secondary chopper for secondary current adjustment to the output side of the rectifier, connect a series circuit of a diode and a capacitor in parallel with the secondary chopper, operate the secondary chopper as a boosting chopper, thereby improve the power factor of the inverter. And a proposal of multiplexing the converter of the controller is made to improve the current waveform.

In the system indicated in above Patent Publication, a secondary chopper circuit is required, thus a problem arises that the circuit constitution is complicated. Further, the system is structured to add the secondary chopper to the conventional Scherbius apparatus, so that a problem arises that the conversion efficiency is lowered. Furthermore, the multiplexing of the converter causes very complication to the circuit constitution.

SUMMARY OF THE INVENTION

The present invention is intended to provide a controller for a wound-rotor induction motor composed of a comparatively simple circuit for realizing efficient conversion and suppressing a ripple current.

According to an aspect of the present invention is to provide the controller for the wound-rotor induction motor includes a first voltage-type converter connected to a secondary winding of a wound-rotor induction motor driven by an AC power supply, a capacitor for smoothing DC output voltage from the first voltage-type converter, a second voltage-type converter for supplying the AC power supply with a regenerated power from the output of a D.C. power of the first voltage-type converter, a speed detecting means for detecting a speed of the wound-rotor induction motor, a current detecting means for detecting the secondary current of the wounded-rotor induction motor, a voltage detecting means for detecting the DC voltage applied to the capacitor, a speed control means for controlling the speed detected by the speed detecting means in response to a referential speed, and for outputting a secondary current as a referential current, a first PWM control means for controlling the current output from the current detecting means in response to the referential current, and for outputting a voltage signal by witch self extinguishing type switching elements of the first voltage-type converter are controlled by pulse-width modulation, and a second PWM control means for controlling a voltage output from the voltage detecting means in response to a referential voltage, and for controlling by PWM self extinguishing type switching elements constituting the second voltage-type converter, wherein the first PWM control means is constituted to control an ON-OFF ratio of a period in which the first voltage-type converter makes short circuits of the secondary winding of the wound-rotor induction motor.

In accordance with the aspect of the present invention, a controller for a wound-rotor induction motor composed of a comparatively simple circuit for realizing efficient conversion and suppressing a ripple current may be provided.

DETAILED DESCRIPTION OF THE INVENTION

Embodiments of the present invention will be explained in reference to the drawings as follows.

First Embodiment

Figure 1:
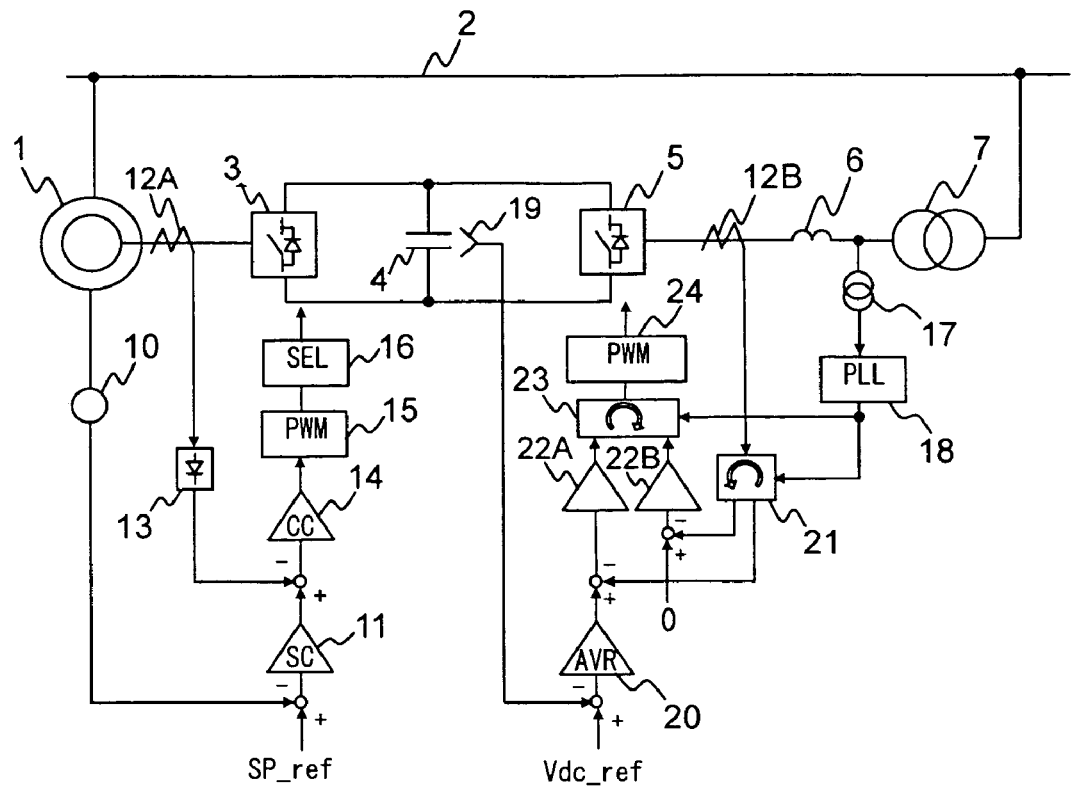
FIG. 1 is a block diagram of a controller for a wound-rotor induction motor according to first embodiment of the present invention.

The controller for a wound-rotor induction motor relating to first embodiment of the present invention will be explained by referring to FIGS. 1 to 3. FIG. 1 is a block diagram of the controller for a wound-rotor induction motor relating to first embodiment of the present invention.

In a wound-rotor induction motor 1, power is supplied from an AC power supply 2 to a primary winding, and secondary power induced in the secondary winding is supplied to a smoothing capacitor 4 via a voltage-type converter 3 composed of self extinguishing type switching elements. DC voltage applied to the smoothing capacitor 4 is converted to an AC voltage by a voltage-type converter 5. An output AC power from the voltage-type converter 5 is regenerated to the AC power supply 2 via a filter reactor 6 and a transformer 7.

In the main circuit constitution aforementioned, there is a case that a secondary resistance switching circuit for starting and a backup operation is attached, though it is not drawn. The constitution of the control part of the voltage-type converter 3 will be explained hereinafter.

To the wound-rotor induction motor 1, a speed detector 10 is attached. A speed feed-back signal detected by the speed detector 10 and a referential speed signal SP_ref are compared and controlled by a speed controller 11. A secondary current from the wound-rotor induction motor 1 is detected by a current detector 12A and the signal is converted to a DC current by a diode rectifier circuit 13 and is compared and controlled with a referential current, which is an output of the speed controller 11, by a current controller 14. By an output signal of the current controller 14, the gate of the self extinguishing type switching elements constituting the voltage-type converter 3 is PWM-controlled via a PWM circuit 15 and a selection switching circuit 16. Here, the PWM control is a control by pulse width modulation and it indicates a method for changing the pulse width of the self extinguishing type switching elements constituting a converter to control an average output voltage of the converter.

The constitution of the controller of the voltage-type converter 5 will be explained. The AC supply voltage of the transformer 7 on the secondary side is detected by a voltage detector 17 and an AC power phase θ is obtained by a phase-locked loop (PLL) circuit 18. A DC voltage of the smoothing capacitor 4 is detected by a voltage detector 19, and the DC voltage and a referential voltage signal Vdc_ref are compared and controlled by a voltage controller 20, and a regenerative current referential signal is obtained. An AC output current of the voltage-type converter 5 is detected by a current detector 12B and the AC output current is decomposed into an active current of the DC amount and a reactive current thereof by a coordinate conversion circuit 21 for setting the AC power phase θ aforementioned to a referential phase. The active current and a regenerative current referential signal are compared and controlled by a current controller 22A, and the reactive current and a zero current referential signal for controlling the reactive current to zero are compared and controlled by a current controller 22B. Two control outputs of the current controllers 22A and 22B are converted from two phases to three phases by a coordinate conversion circuit 23, and a 3-phase voltage referential signal is obtained, and gates of the self extinguishing type switching elements constituting the voltage-type converter 5 are controlled by pulse width modulation via a PWM circuit 24.

As explained above, the voltage-type converter 5 controls the DC voltage to a referential voltage Vdc_ref and controls the reactive current to zero, so that a power factor 1.0 of the voltage-type converter 5 can be obtained.

The operation of the voltage-type converter 3 having the aforementioned constitution will be explained by referring to FIGS. 2 and 3. FIG. 2 is a circuit block diagram for explaining the operation of the voltage-type converter 3.

Figure 2:
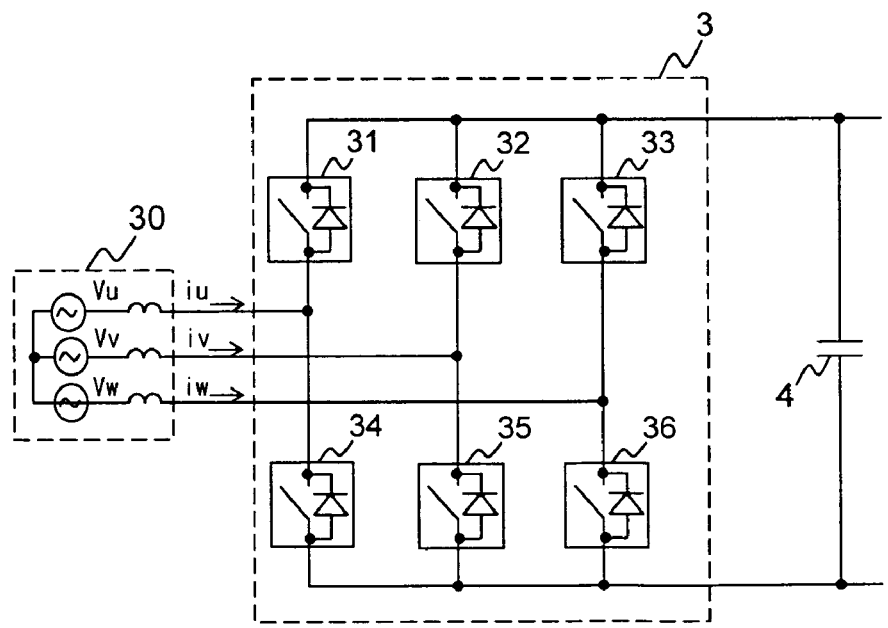
FIG. 2 is a circuit block diagram for explaining an operation of the controller shown in FIG. 1.

In FIG. 2, the secondary winding of the wound-rotor induction motor 1 generates an AC voltage at a slip frequency with amplitude proportional to the slip frequency. The secondary winding has winding impedance, so that it may be expressed by an equivalent circuit 30. The voltage-type converter 3, as shown in FIG. 2, includes six self extinguishing type switching elements 31 to 36 in a bridge shape. Each of the self extinguishing type switching elements has a flywheel diode in anti-parallel connection. The self extinguishing type switching elements 31, 32, and 33 constitute a upper arm of the voltage-type converter 3, and the self extinguishing type switching elements 34, 35, and 36 constitute a lower arm thereof. The PWM circuit 15 shown in FIG. 1, to increase the secondary current of the wound-rotor induction motor 1, for example, turns on the self extinguishing type switching elements 31, 32, and 33 and turns off the self extinguishing type switching elements 34, 35, and 36. By doing this, viewed from the secondary side of the wound-rotor induction motor 1, the three phases are short circuited and according to the current increase rate depending on the secondary winding voltage and the winding impedance, the current is increased.

On the other hand, to decrease the secondary current, the self extinguishing type switching elements 31, 32, and 33 short-circuited are turned off. At this time, the flowing current passes the flywheel diode shown in FIG. 2, charges the smoothing capacitor 4, and stores the secondary power in the smoothing capacitor 4.

The ON-OFF operation aforementioned is repeated, and the ratio of the ON period to make a short circuit is adjusted, thus the secondary current (secondary power) may be controlled.

Figure 3:
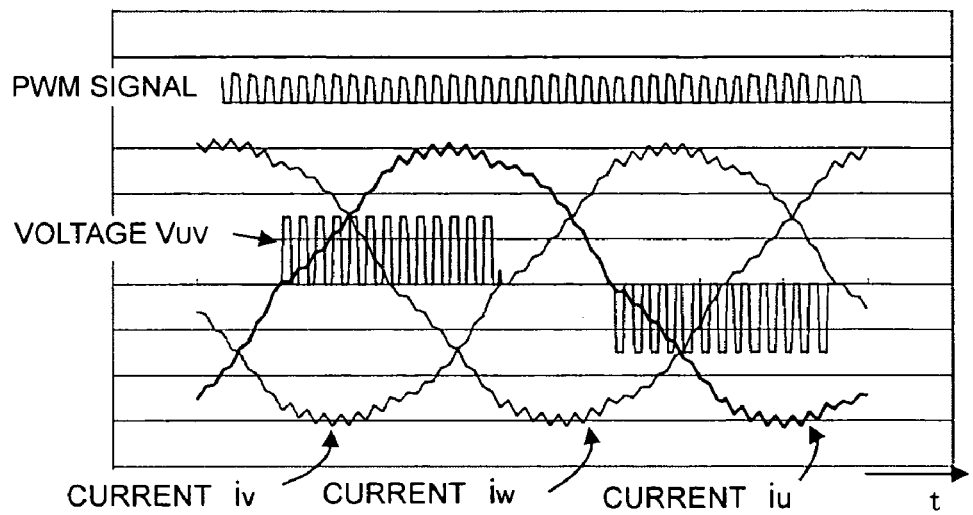
FIG. 3 is a waveform diagram for explaining an operation of the circuit block diagram shown in FIG. 2.

FIG. 3 shows an example of voltage wave form and current waveforms in the operation. This is an example that a modulation frequency of the PWM circuit 15 is higher than a slip frequency. The switching operation is performed in a state that ON period to make the short circuit of secondary winding and OFF period to open the circuit by PWM signal are almost same. The drawing shows that the current waveform in each phase is a sinusoidal wave shaped proportional to the secondary winding voltage.

In the repetition of the ON-OFF operation mentioned above, the elements to be turned on are the self extinguishing type switching elements 31, 32, and 33 of the upper arm. The self extinguishing type switching elements 34, 35, and 36 of the lower arm may be turned on. When using alternately the upper arm and the lower arm by the selection switching circuit 16, a switching loss of the self extinguishing type switching elements 31 to 36 may be averaged.

The conversion efficiency in this embodiment will be considered. Under the aforementioned control, when the current path at the ON time is taken into account, the current flows through one self extinguishing type switching element and one diode. And, at the OFF time, the current flows through two diodes and charges the smoothing capacitor 4. On the other hand, in the secondary chopper system indicated in aforementioned Patent Publication, at the ON time, the current flows through one self extinguishing type switching element and two diodes. And, at the OFF time, the current flows through three diodes and charges the smoothing capacitor 4. Therefore, it is clear that the power supply loss is reduced and the conversion efficiency is improved by the present invention.

According to this embodiment, when the short circuit mode of the voltage-type converter 3 which is a converter on the motor side is used alternately by the upper and the lower arm, the switching loss may be balanced and the capacity of the converter may be effectively used at its maximum. Instead of the voltage-type converter 3, the same as the voltage-type converter 5 which is a converter on the power supply side may be used, thus an apparatus including shared and standardized spare parts may be used.

As explained above, according to this embodiment, the secondary current of the induction motor may be controlled to a sinusoidal wave shape, so that there is an excellent respect obtained that ripple torque of a frequency 6 times of the slip frequency generated by the 6-pulse diode converter of the conventional Scherbius apparatus is not generated in principle.

The modulation system of the PWM circuit 15 may be controlled by either of the instantaneous current comparison system or the triangular wave comparison system.

Second Embodiment

Figure 4:
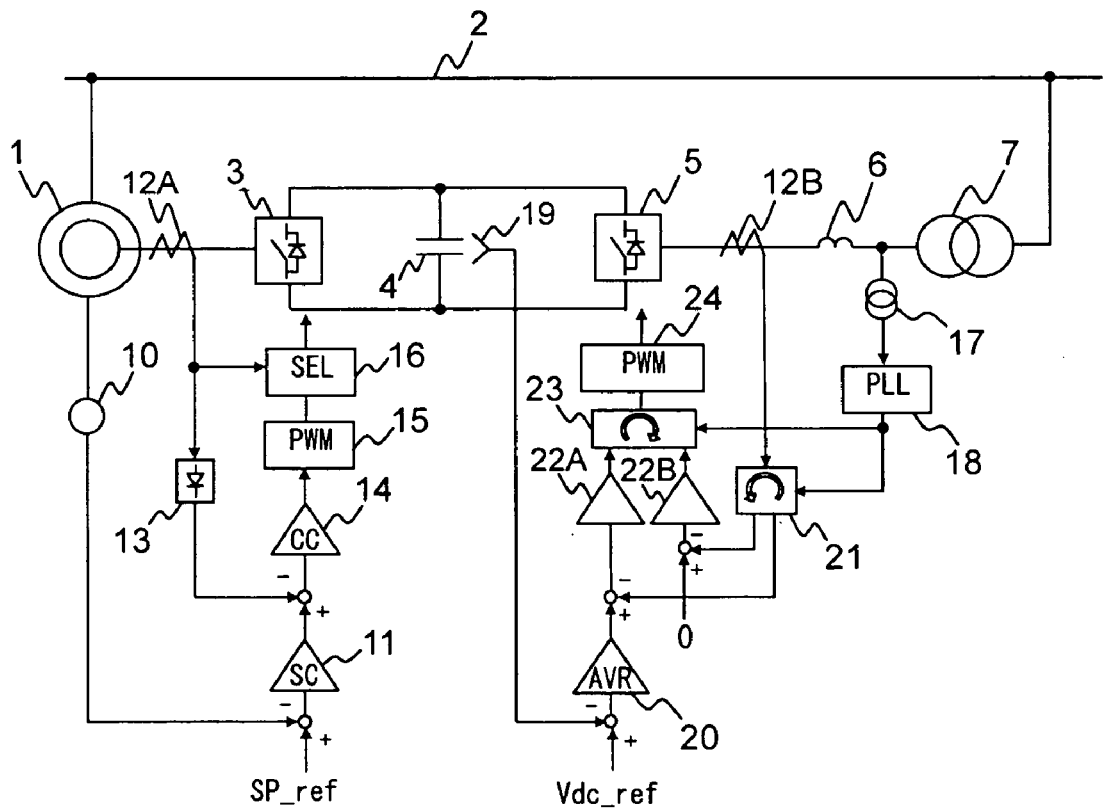
FIG. 4 is a block diagram of a controller for a wound-rotor induction motor according to second embodiment of the present invention.
Figure 5:
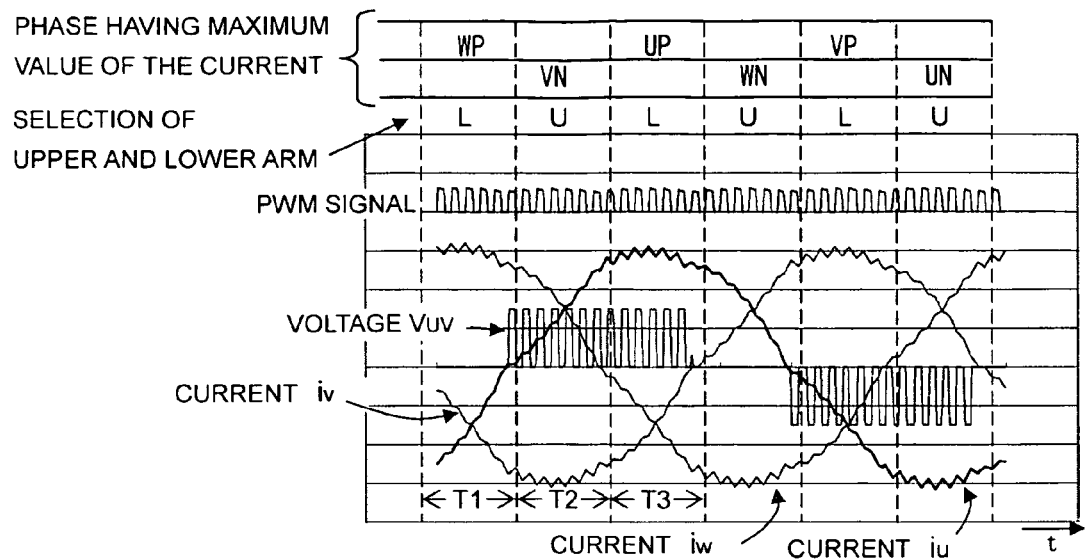
FIG. 5 is a waveform diagram for explaining an operation of the controller shown in FIG. 4.

The controller for a wound-rotor induction motor relating to second embodiment of the present invention will be explained by referring to FIGS. 4 and 5. FIG. 4 is a block diagram of the controller for a wound-rotor induction motor relating to second embodiment of the present invention.

To the same parts of second embodiment as those shown in the block diagram of the controller for a wound-rotor induction motor relating to first embodiment shown in FIG. 1, the same numerals are assigned and the explanation thereof will be omitted. An instantaneous value signal of the secondary current is given to a selection switching circuit 16A in second embodiment as shown in FIG. 4.

The instantaneous value signal of the secondary current is inputted to the selection switching circuit 16A. The selection switching circuit 16A selects the mode of an upper arm of the first voltage type converter or a lower arm thereof to make a short circuit of the secondary winding of the wound-rotor induction motor, and select the mode so as not to switch a phase in which an absolute value of current is maximized among three phases currents detected by the secondary current detector 12A. The operation waveform diagram shown in FIG. 5 shows the situation that either of the upper arm or the lower arm is selected. In a period of T1, phase W of positive current takes maximum absolute value, so that the selection switching circuit 16A selects the lower arm of the first voltage type converter. In a period of T2, phase V of negative current takes maximum absolute value, so that the selection switching circuit 16A selects the upper arm of the first voltage type converter, and in a period of T3, phase U of positive current takes maximum absolute value, so that the selection switching circuit 16A selects the lower arm of the first voltage type converter, and so on.

As mentioned above, when either of the upper arm or the lower arm is selected to prevent the current in the phase where the absolute current is maximized from turning on or off, a current always averaged may be turned on or off. The switching loss of the self extinguishing type switching elements, if the current to be turned on or off increases, increases in proportion to a value between an amount of the current and the square of the amount of the current, so that according to second embodiment, it is possible to more reduce the switching loss and more improve the conversion efficiency.

Third Embodiment

Figure 6:
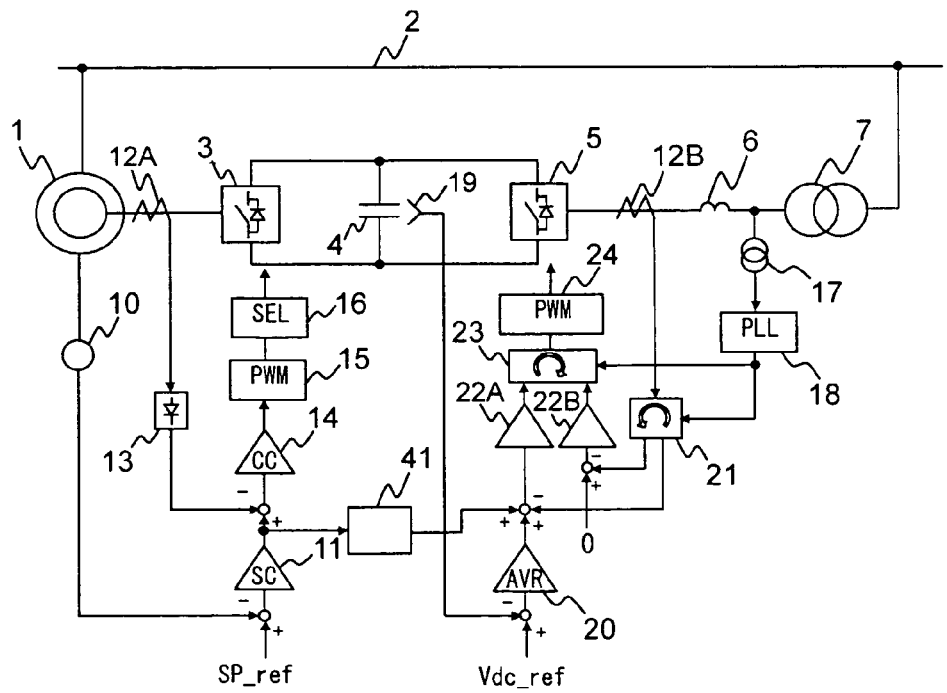
FIG. 6 is a block diagram of a controller for a wound-rotor induction motor according to third embodiment of the present invention.

FIG. 6 is a block diagram of the controller for a wound-rotor induction motor relating to third embodiment of the present invention.

To the same parts of third embodiment as those shown in the block diagram of the controller for a wound-rotor induction motor relating to first embodiment shown in FIG. 1, the same numerals are assigned and the explanation thereof will be omitted. In third embodiment, the secondary current referential signal which is the output of the speed controller 11 is added to the regenerative referential current which is the output of the voltage controller 20 of the voltage-type converter 5 via a gain 41 as shown in FIG. 6. It means this embodiment uses so called feed-forward control.

Under the DC voltage control of the smoothing capacitor 4, it is difficult to increase the response so much due to the LC resonance system of a main circuit. However, as shown in FIG. 6, when the feed-forward control is taken in, in the transient state at time of changing in the load, the voltage controller 20 is bypassed in a voltage control system of the voltage-type converter 5. As a result, it is clear that the response speed may be increased without impairing the safety.

Fourth Embodiment

Figure 7:
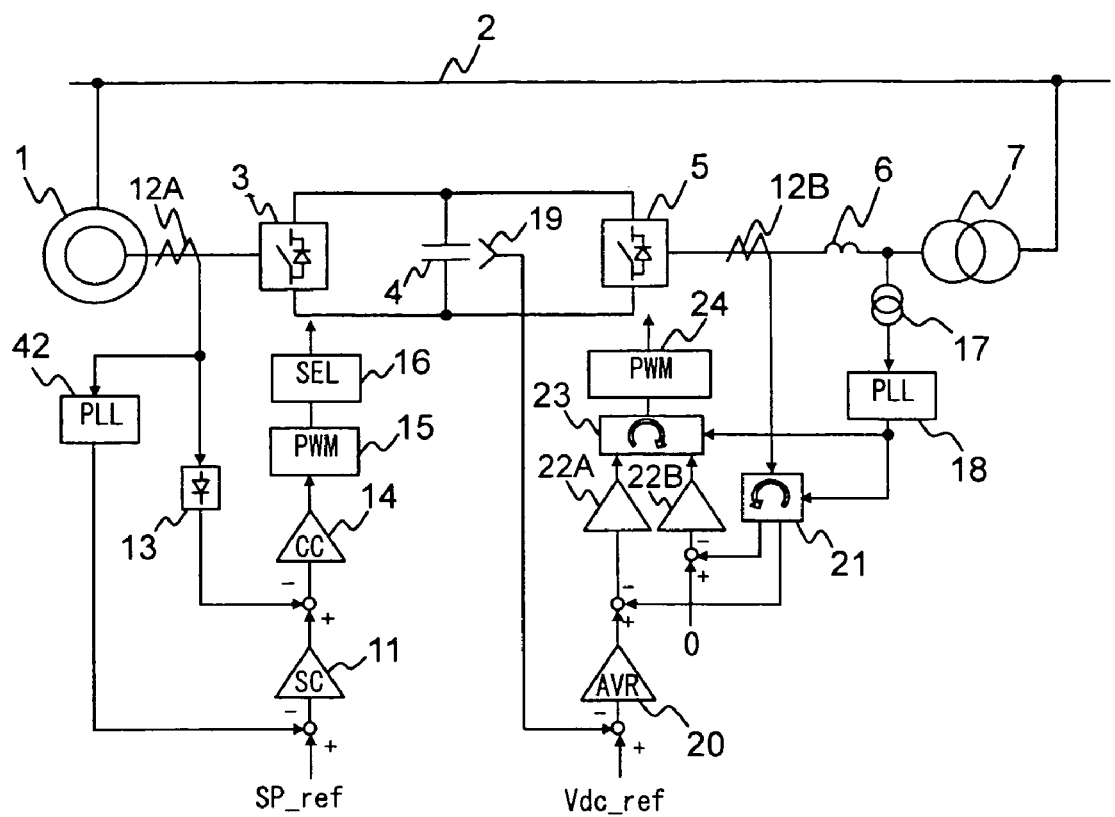
FIG. 7 is a block diagram of a controller for a wound-rotor induction motor according to fourth embodiment of the present invention.

FIG. 7 is a block diagram of the controller for a wound-rotor induction motor relating to fourth embodiment of the present invention.

To the same parts of fourth embodiment as those shown in the block diagram of the controller for a wound-rotor induction motor relating to first embodiment shown in FIG. 1, the same numerals are assigned and the explanation thereof will be omitted. In fourth embodiment, a PLL conversion circuit 42 for inputting an instantaneous value signal of the secondary current is installed in place of the speed detector 10, and the output thereof is used as a speed feed-back signal as shown in FIG. 7.

A secondary AC current signal detected by the current detector 12A is inputted to the PLL conversion circuit 42. The PLL conversion circuit 42 removes a noise signal and detects a fundamental wave, so that it converts it to a frequency of the secondary current by a simple conversion operation. The secondary current flows in proportion to the secondary winding voltage, so that the frequency detected from the secondary current is a slip frequency. The slip frequency detected is subtracted from the frequency of the power supply in the PLL conversion circuit 42, thus the rotating frequency of the motor is detected.

When a load of the wound-rotor induction motor 1 has a square torque characteristic such as a pump, within the regular operation range, no-load will not be occurred and the secondary current flows always. Therefore, according to fourth embodiment, within the overall operation range, the speed of the motor can be detected.

Fifth Embodiment

Figure 8:
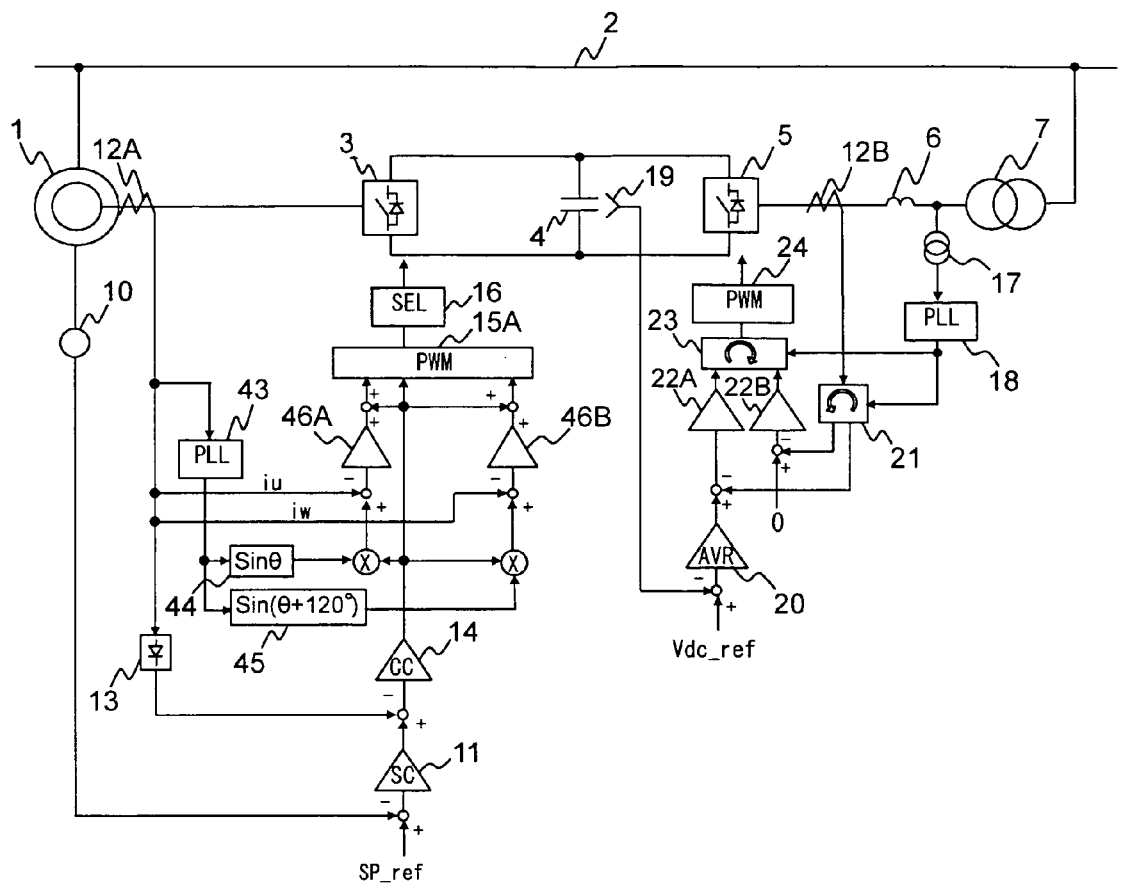
FIG. 8 is a block diagram of a controller for a wound-rotor induction motor according to fifth embodiment of the present invention.

FIG. 8 is a block diagram of the controller for a wound-rotor induction motor relating to fifth embodiment of the present invention.

To the same parts of fifth embodiment as those shown in the block diagram of the controller for a wound-rotor induction motor relating to first embodiment shown in FIG. 1, the same numerals are assigned and the explanation thereof will be omitted. A PLL circuit 43, sinusoidal wave function circuits 44 and 45, and controllers 46A and 46B are used in fifth embodiment as shown in FIG. 8. The PLL circuit 43 detects a phase θ of the secondary current, and sinusoidal wave function circuits 44 and 45 generate sinusoidal wave signals Sin θ and Sin(θ+120°) according to the phase θ respectively. Sinusoidal wave signals Sin θ and Sin(θ+120°) are multiplied by the secondary referential current, referential signals of a phase-U sinusoidal wave current and a phase-W sinusoidal wave current based on an AC instantaneous value are obtained respectively. The referential signal of a phase-U sinusoidal wave current is compared with a secondary current detection signal iu and controlled by a controller 46A. The referential signal of a phase-w sinusoidal wave current is compared with a secondary current detection signal iw and controlled by a controller 46B. Output obtained by controllers 46A and 46B is inputted to a PWM circuit 15A.

By the PWM circuit 15A, each phase of the voltage-type converter 3 can be controlled individually, so that in the three phases, the instantaneous value waveforms may be controlled to a sinusoidal wave. The reason that the phase V is omitted here is that the total of instantaneous values of the three-phase current is zero, so that operations can be performed.

As explained above, according to fifth embodiment, the current waveform in each phase is controlled to an ideal sinusoidal wave, and the harmonic component of the secondary current is substantially reduced to zero, and no ripple torque is generated.

Sixth Embodiment

Figure 9:
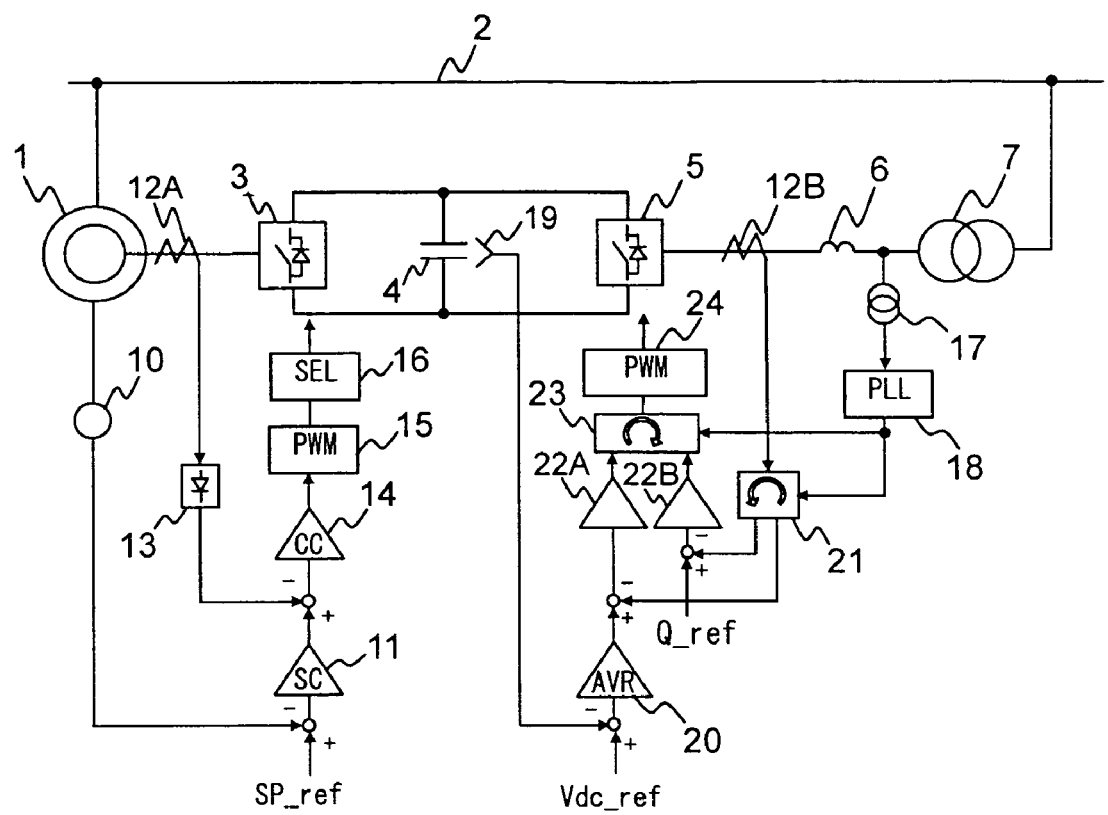
FIG. 9 is a block diagram of a controller for a wound-rotor induction motor according to sixth embodiment of the present invention.

FIG. 9 is a block diagram of the controller for a wound-rotor induction motor relating to sixth embodiment of the present invention.

To the same parts of sixth embodiment as those shown in the block diagram of the controller for a wound-rotor induction motor relating to first embodiment shown in FIG. 1, the same numerals are assigned and the explanation thereof will be omitted. In sixth embodiment, the referential reactive current is set to Q_ref for canceling a lagging current generated by the wound-rotor induction motor 1 instead of zero as shown in FIG. 9.

The reactive current for canceling the lagging current generated by the wound-rotor induction motor 1 flows through the primary side of the transformer 7 in this way, thus the power factor of the whole system can be controlled to 1.0.

It is clear that the reactive current of the wound-rotor induction motor 1 is detected and the value of the inverse polarity thereof is set to the referential reactive current, similar results may be obtained.

What is claimed is:

1. A controller for a wound-rotor induction motor comprising:
    a first voltage-type converter connected to a secondary winding of a wound-rotor induction motor driven by an AC power supply;
    a capacitor for smoothing DC output voltage from the first voltage-type converter;
    a second voltage-type converter for supplying the A.C. power supply with a regenerated power from the output of a D.C. power of the first voltage-type converter;
    a speed detecting means for detecting a speed of the wound-rotor induction motor;
    a current detecting means for detecting the secondary current of the wounded-rotor induction motor;
    a voltage detecting means for detecting the DC voltage applied to the capacitor;
    a speed control means for controlling the speed detected by the speed detecting means in response to a referential speed, and for outputting a secondary current as a referential current;
    a first PWM control means for controlling the current output from the current detecting means in response to the referential current, and for outputting a voltage signal by witch self extinguishing type switching elements of the first voltage-type converter are controlled by pulse-width modulation; and
    a second PWM control means for controlling a voltage output from the voltage detecting means in response to a referential voltage, and for controlling by PWM self extinguishing type switching elements constituting the second voltage-type converter;
    wherein the first PWM control means is constituted to control an ON-OFF ratio of a period in which the first voltage-type converter makes short circuits of the secondary winding of the wound-rotor induction motor.

2. A controller for a wound-rotor induction motor according to claim 1, wherein the first PWM control means makes a short circuit of the secondary winding of the wound-rotor type induction motor using an upper arm of the first voltage-type converter and a lower arm of the first voltage-type converter alternately.

3. A controller for a wound-rotor induction motor according to claim 1, wherein:
    the first PWM control means has a mode selecting means for selecting an upper arm of the first voltage type converter or a lower arm of the first voltage type converter to make a short circuit of the secondary winding of the wound-rotor induction motor, and
    the mode selecting means is constituted to select the mode so as not to switch a phase in which an absolute value of current is maximized among three-phase currents detected by the secondary current detecting means.

4. A controller for a wound-rotor induction motor according to claim 1, further comprising a reactive current detecting means for detecting an output current of the second voltage-type converter,
    wherein said second PWM control means is constituted to control the reactive current of the second voltage-type converter to be substantially zero.

5. A controller for a wound-rotor induction motor according to claim 1, further comprising a reactive current detecting means for detecting an output current of the second voltage-type converter,
    wherein said second PWM control means is constituted to control the reactive current of the second voltage-type converter to be canceled a reactive current of the wound-rotor induction motor.

6. A controller for a wound-rotor induction motor according to claim 1, further comprising a speed compensating means for compensating the voltage output of the second voltage-type converter by adding an output signal from the speed control means.

7. A controller for a wound-rotor induction motor according to claim 1, wherein said speed detecting means includes a slip frequency detecting means for detecting a slip frequency of the wound-rotor induction motor from the secondary current, and a speed calculating means for calculating the speed of the wound-rotor induction motor by subtracting the slip frequency from the frequency of the power supply.

8. A controller for a wound-rotor induction motor according to any one of claims 1 to 7, wherein the first PWM control means includes a comparing means in at least two phases among three for comparing each signal of secondary current by the current detecting means with each referential signal corresponding to said each signal, and a timing control means in each phase for controlling an ON-OFF timing of the switching elements of the first voltage-type converter in response to an output of said comparing means.

9. A controller for a wound-rotor induction motor comprising:
- a first voltage-type converter connected to a secondary winding of a wound-rotor induction motor driven by an AC power supply;
- a capacitor for smoothing DC output voltage from the first voltage-type converter;
- a second voltage-type converter to supply the A.C. power supply with a regenerated power from the output of a D.C. power of the first voltage-type converter;
- a speed detector of the wound-rotor induction motor;
- a secondary current detector of the wounded-rotor induction motor;
- a voltage detector of the DC voltage applied to the capacitor;
- a speed controller to control the speed detected by the speed detector in response to a referential speed, and to output a secondary current as a referential current;
- a first PWM controller to control the current output from the current detector in response to the referential current, and to output a voltage signal by witch self extinguishing type switching elements of the first voltage-type converter are controlled by pulse-width modulation; and
- a second PWM controller to control a voltage output from the voltage detector in response to a referential voltage, and to control by PWM self extinguishing type switching elements constituting the second voltage-type converter;
- wherein the first PWM controller is constituted to control an ON-OFF ratio of a period in which the first voltage-type converter makes short circuits of the secondary winding of the wound-rotor induction motor.

* * * * *